United States Patent [19]

Tsuiki et al.

[11] 3,875,386

[45] Apr. 1, 1975

[54] ZERO SUPPRESSION CIRCUIT

[75] Inventors: Takao Tsuiki; Yoshikazu Hatsukano, both of Tokyo, Japan

[73] Assignee: Hitachi, Ltd., Tokyo, Japan

[22] Filed: Oct. 4, 1973

[21] Appl. No.: 403,556

[30] Foreign Application Priority Data

Oct. 4, 1972 Japan .............................. 47-99047

[52] U.S. Cl............ 235/152, 340/172.5, 340/324 R

[51] Int. Cl............................................... G06f 3/14

[58] Field of Search......... 235/152, 156; 340/324 R, 340/172.5

[56] References Cited

UNITED STATES PATENTS

| | | | |
|---|---|---|---|
| 3,449,726 | 6/1969 | Kawamoto et al. | 340/172.5 |
| 3,492,656 | 1/1970 | Hildebrandt | 340/172.5 |
| 3,678,471 | 6/1972 | Ragen et al. | 340/172.5 |
| 3,732,545 | 5/1973 | Hatano et al. | 340/172.5 |
| 3,749,896 | 7/1973 | Munt | 235/152 |

*Primary Examiner*—Malcolm A. Morrison
*Assistant Examiner*—David A. Malzahn
*Attorney, Agent, or Firm*—Craig & Antonelli

[57] ABSTRACT

A zero suppression circuit for a display of an electronic calculator or the like employs a register which includes *n* flip-flops for storing a decimal point signal and signals representing whether the digits of respective places are any of the digits 1 to 9, and a detector circuit which includes *n* OR gates, the *i*-th gate of the detector circuit being supplied with the output signals of the first to *i*-th flip-flops of the register. An output "0" of the *i*-th OR gate signifies that neither a digit from 1 to 9 nor a decimal point exists in and below the *i*-th place, so the digit 0 in the *i*-th place is unnecessary. Through such a judgement, the unnecessary zeros below the decimal point are prevented from being indicated in the display. When further detector circuits are provided, unnecessary zeros in the upper places can also be prevented from being indicated.

8 Claims, 3 Drawing Figures

ZERO SUPPRESSION CIRCUIT

BACKGROUND OF THE INVENTION

1. Field of the Invention

The present invention relates to the indicator circuit of an electronic calculator or the like and, more particularly, to a zero suppression circuit for preventing unnecessary zeros below a decimal point from being indicated.

2. Description of the Prior Art

In conventional electronic desk calculators and the like, all the places of an indicating device are brought to the zero indication after the closure of the power supply switch. Subsequently, when the first or second operand is set or when a calculated result is requested, all the places except those necessary for the indication are indicated as zeros. For example, where a four-figure number 1234 is set, an expression 001234.00 is given by the indicating device.

With such an indicating system, the unnecessary zeros are indicated in the places above and below those required for the indication. For this reason, the indication is difficult to read, and misreading may become a problem.

Where, with the miniaturization of the electronic desk calculator, a battery is employed as the power supply, the power consumption of the calculator must be made low in order to lengthen the life of the power supply. Since the indicating portion exploits electro-optic conversion, the power consumption thereof is high in comparison with those of the arithmetic portion, etc., and the indication of the unnecessary zeros is not negligible.

SUMMARY OF THE INVENTION

It is, accordingly, an object of the present invention to provide a zero suppression circuit which can reduce the power consumption in an indicator circuit.

Another object of the present invention is to provide a zero suppresion circuit which prevents unnecessary zeros below a decimal point from being indicated.

Still, another object of the present invention is to provide a zero suppression circuit which prevents unnecessary zeros in both the upper and lower places from being indicated.

The present invention itself and further objects of the present invention will become apparent from the following detailed description taken with reference to the accompanying drawings.

PREFERRED EMBODIMENT OF THE INVENTION

Figure 1:
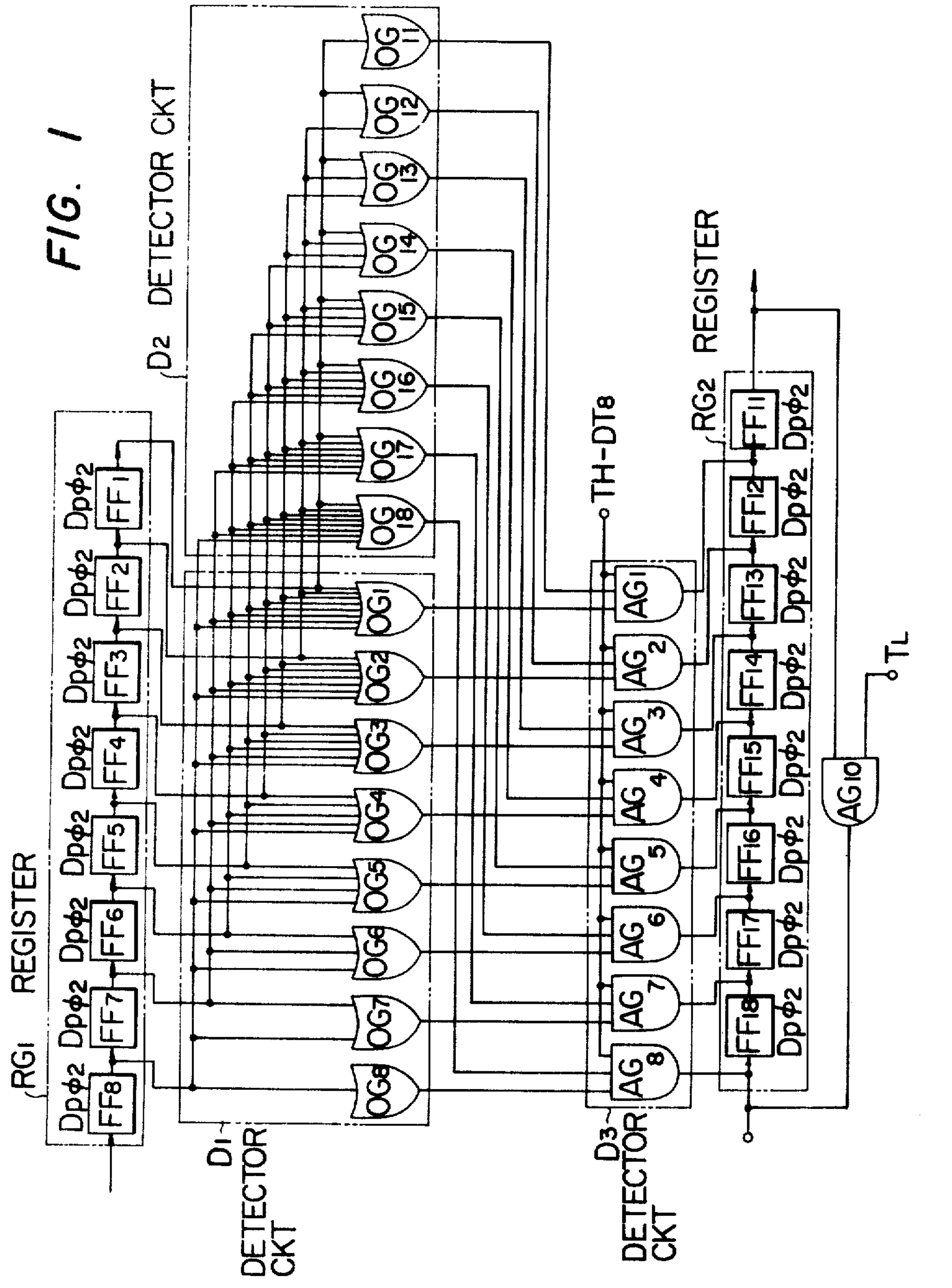
FIG. 1 is a connection diagram showing the zero suppression circuit according to the present invention.

FIG. 1 shows an embodiment of the zero suppression circuit according to the present invention.

Referring to the figure, $RG_1$ designates a register, which is composed of eight flip-flop circuits $FF_1$–$FF_8$. The flip-flop circuits $FF_1$–$FF_8$ are connected in cascade. Each of these flip-flop circuits is constructed as a two-phase delay type flip-flop circuit which uses a digit pulse $D_p$ and a clock pulse $\phi_2$ as shift pulses (or trigger pulses). Information is written in accordance with the timing of the clock pulses $\phi_2$.

$D_1$ denotes a circuit for detecting unnecessary zeros in upper places, which is composed of OR circuits $OG_1 - OG_8$. $D_2$ indicates a circuit for detecting unnecessary zeros in lower places, which is composed of OR circuits $OG_{11} - OG_{18}$. The OR circuit $OG_1$ receives the output signals of the eight flip-flop circuits $FF_1 - FF_8$ as its inputs. The 7-input OR circuit $OG_2$ receives the output signals of the flip-flop circuits $FF_2 - FF_8$ as its inputs. In this manner, the $i$-th ($i = 1, 2, \ldots 8$) $(9 - i)$-input OR circuit $OG_i$ in the unnecessary-upper-zero detector circuit $D_1$ receives as its inputs the output signals of the flip-flop circuits from that $FF_i$ in the $i$-th place (as determined from the lowermost place) to that $FF_8$ in the uppermost place. On the other hand, the $i$-th ($i = 1, 2, \ldots 8$) $i$-input OR circuit $OG_{1i}$ in the unnecessary -lower-zero detector circuit $D_2$ conversely receives as its inputs the output signals of the flip-flop circuits from that $FF_i$ in the $i$-th place to that $FF_1$ in the lowermost place.

$D_3$ represents a circuit for detecting unnecessary zeros in upper and lower places, which is composed of eight 3-input AND circuits $AG_1 - Ag_8$. On the input side of the $i$-th AND circuit $AG_i$, there are applied output signals of the respective $i$-th OR circuits $OG_i$ and $OG_{1i}$ of the unnecessary-upper-zero detector circuit $D_1$ and unnecessary-lower-zero detector circuit $D_2$. To all the AND circuits $AG_1 - AG_8$, a timing pulse $T_H - DT_8$ is applied as a control input. Although, in order to facilitate the explanation, the 1-input OR circuits $OG_8$ and $OG_{11}$ are shown in the detector circuits $D_1$ and $D_2$, they are not necessarily required. For example, the flip-flop circuit $FF_8$ and the AND circuit $AG_8$ may be directly connected.

$RG_2$ designates a register, which is composed of two-phase delay type flip-flop circuits $FF_{11} - FF_{18}$ being the same in construction as the foregoing flip-flop circuits $FF_1 - FF_8$. The flip-flop circuits $FF_{11} - FF_{18}$ are connected in cascade. The output side of the flip-flop circuit $FF_{11}$ is fed-back through an AND circuit $AG_{10}$ onto the input side of the flip-flop circuit $FF_{18}$. The formation of the feedback loop is controlled by a timing pulse $T_L$. On the input side of the flip-flop circuit $FF_{1i}$ in the $i$-th place, an output signal of the $i$-th AND circuit $AG_i$ is applied.

Figure 2:
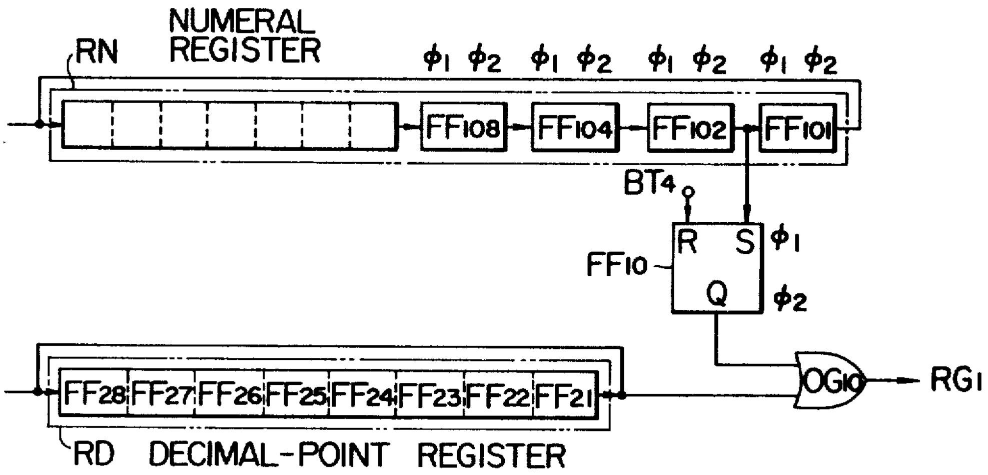
FIG. 2 is a connection diagram showing a digit discriminating circuit which discriminates whether or not a digit from 1 to 9 or a decimal point is present in each place of a decimal number.

FIG. 2 shows a digit discriminating circuit to be connected at the stage preceding the zero suppression circuit in FIG. 1. The digit discriminating circuit discriminates whether a decimal point or a digit from 1 to 9 is present or absent in each place of a decimal number.

Referring to the figure, RN indicates a numeral register. Where the binary-coded decimal system is adopted as the notation, a decimal number of one figure is stored by four bits of flip-flop circuits $FF_{101}$–$FF_{104}$. Assuming that the calculating or indicating capability of the calculator concerned is eight places, the register RN requires a number of such flip-flop circuits by at least 8 × 4 bits. Each of the flip-flop circuits $FF_{101} - FF_{104}$ is constructed as a two-phase delay type flip-flop circuit whose shift pulses are clock pulses $\phi_1$ and $\phi_2$.

$FF_{10}$ designates a set preference flip-flop circuit. Applied at its set input S is an output signal of the flip-flop circuit $FF_{104}$ at the second bit in the lowermost place of the register RN, while applied at its reset input R is a bit signal $BT_4$. The flip-flop circuit $FF_{10}$ is also in the construction of the delay type in which the shift operation is effected by the clock pulses $\phi_1$ and $\phi_2$. The truth table is given below.

| S | R | $Q_{n+1}$ |
|---|---|---|
| 0 | 0 | $Q_n$ |
| 1 | 0 | 1 |
| 0 | 1 | 0 |
| 1 | 1 | 1 |

RD represents a decimal-point register, which is used to store the position of the decimal point of the number stored in the numeral register RN and which is composed of eight flip-flop circuits $FF_{21}$ – $FF_{28}$. These flip-flop circuits have the construction of the two-phase delay type flip-flop circuit whose shift pulses are the digit pulse $D_p$ and the clock pulse $\phi_2$.

Output signals of the flip-flop circuit $FF_{10}$ and the decimal-point register RD are combined by an OR circuit $OG_{10}$. The resultant signal is fed to the register $RG_1$.

Figure 3:
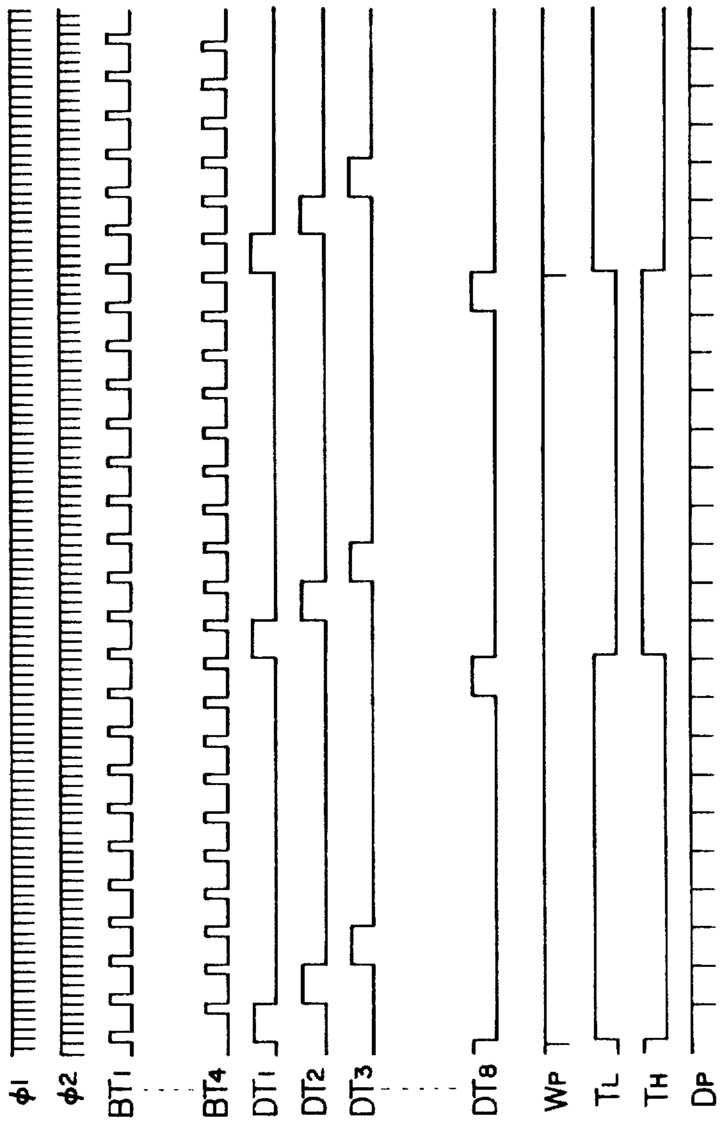
FIG. 3 is a chart showing timing pulses used in the circuits in FIGS. 1 and 2.

Various pulse signals for use in the embodiment will now be explained with reference to FIG. 3. In the figure, the upper level of each pulse signal indicates a reference potential or the ground potential (logical 1), while the lower level a negative potential (logical 0). The clock pulses $\phi_1$ and $\phi_2$ are generated by, for example, astable multivibrators. They are continuously generated within the calculator and are employed for the shifting or triggering operation of the memory elements (delay type flip-flops) connected in cascade in the registers, the other flip-flop circuits, etc. Bit signals $BT_1$ – $BT_4$ are used where binary parallel signals derived from an encoder are to be transformed into binary series signals. In the embodiment, the bit signal $BT_4$ is utilized as the reset input signal of the flip-flop circuit $FF_{10}$. Digit signals $DT_1$ – $DT_8$ are used as, for example, place switching signals in the dynamic indication system. In the embodiment, they are used as the control pulses of the detector circuit $D_2$. The digit pulse $D_p$ is used for distinguishing the places of the binary-coded decimal number, while a word pulse $W_p$ (not especially employed in the embodiment) serves to distinguish words. The characteristic equations of the respective pulses are:

$$D_p = \overline{BT_4 \cdot \bar{\Phi}_1}, \quad W_p = \overline{BT_4 \cdot \bar{\Phi}_1 \cdot DT_8 \cdot T_H}$$

Accordingly, the pulses $D_p$ and $W_p$ can be formed of the pulses previously stated. The bit signals $BT_1$ – $BT_4$ and the digit signals $DT_1$ – $DT_8$ can be respectively produced from the clock pulses $\phi_2$ and the bit signal $BT_1$ by utilizing counters etc. Here, the pulse width of the bit signals $BT_1$ – $BT_4$ is equivalent to the period of the clock pulses $\phi_1$ or $\phi_2$, and is equivalent to the time of 1 bit of the binary series signal. The pulse width of the digit signals $DT_1$ – $DT_8$ and the period of the digit pulses $D_p$ are equivalent to the period of the bit signals $BT_1$ – $BT_4$, namely, the time of one place (4 bits) of the series binary-coded decimal number. The timing pulses $T_L$ and $T_H$ are used for the control of the register and so forth, and have a pulse width equal to the period of the digit signals. In this manner, as the various timing pulses for use in the embodiment, pulses for use in the other circuits of the electronic caclulator can be employed as they are.

The operation of the zero suppression circuit thus constructed will be described in detail hereunder on every block.

1. Register $RG_1$

The register $RG_1$ stores a decimal-point signal and a signal representing whether the digits of the respective places are any one of the numbers from 1 to 9 or 0. For example, where the position of the decimal point is specified at the fifth place as determined from the lowermost place and where a four-figure number 10.34 is set, the former signal is made 0010000, and the latter signal is made 00101100 if the digits 1 to 9 are converted into a logical 1 and the digit 0 is converted into a logical 0. Thus, a signal 00111100 corresponding to the logical sum between both the above signals is fed to and stored in the register $RG_1$.

Accordingly, when the output of the flip-flop circuit $FF_i$ in the $i$-th place becomes 1 in a predetermined period (at $I_H \cdot DT_8 = 1$), it becomes known that either a digit from 1 to 9 or the decimal point exists in the $i$-th place. When, conversely, it becomes 0, it becomes known that neither a digit from 1 to 9 nor the decimal point exists in the $i$-th place, namely, that only the digit 0 exists in the $i$-th place.

2. Unnecessary - Upper - Zero Detector Circuit $D_1$

The circuit $D_1$ for detecting unnecessary zeros in upper places detects whether unnecessary zeros are present in each place and the places above it, in other words, if either a digit from 1 to 9 or a decimal point is present in the places.

In more detail, the $i$-th OR circuit $OG_i$ receives the output signals of the $i$-th to eighth flip-flop circuits $FF_i$ – $FF_8$ as its inputs. When any one of the signals becomes 1, it is judged that a digit from 1 to 9 or the decimal point is existent in or above the $i$-th place and that no unnecessary zero is existent therein. For example, for a number 03005678 or a number 00.005678, the digits of the fifth and sixth place are 0s, but any digits from 1 to 9 or the decimal point is present in a place above the fifth and sixth places. As a result, the outputs of the OR circuits $OG_5$ and $OG_6$ become 1. It is, accordingly, judged that no unnecessary zero is existent in the fifth and sixth places.

On the other hand, when all the output signals of the $i$-th to eighth flip-flop circuits $FF_i$ – $FF_8$ becomes 0, the output of the OR circuit $OG_i$ becomes 0. It is, accordingly, judged that neither a digit from 1 to 9 nor the decimal point exists in and above the $i$-th place, and that the digit 0 in the $i$-th place is unnecessary.

3. Unnecessary-Lower-Zero Detector Circuit $D_2$

The circuit $D_2$ for detecting unnecessary zeros in lower places detects whether unnecessary zeros are present in each place and the places below it, in other words, if either a digit from 1 to 9 or a decimal point is present in the places.

In more detail, the $i$-th OR circuit $OG_{i i}$ receives the output signals of the first to $i$-th places of flip-flop circuits $FF_1$ – $FF_i$ as its inputs. When any one of the signals becomes 1, it is judged that a digit from 1 to 9 or the decimal point is existent in or below the i-th place, and that no unnecessary zero is existent therein.

On the other hand, when all the output signals of the flip-flop circuits $FF_1$ – $FF_i$ become 0, the output of the OR circuit $OG_{ii}$ becomes 0. It is, accordingly, judged the neither a digit from 1 to 9 nor the decimal point exists in and below the $i$-th place, and that the digit 0 in the $i$-th place is unnecessary.

4. Unnecessary-Upper-and-Lower-Zero Detector Circuit $D_3$

On the basis of the detecting results of the unnecessary-upper-zero detector circuit $D_1$ and the unnecessary-lower-zero detector circuit $D_2$, the detector circuit $D_3$ detects whether unnecessary zeros are present in both upper and lower places. In other words, the detector circuit $D_3$ detects if a digit from 1 to 9 or the decimal point is present in each place and places above and below it. In case where a digit from 1 to 9 or the decimal point is present in both the upper and lower places, it is judged that the digit in the particular place is to be indicated.

The $i$-th AND circuit $AG_i$ receives as its inputs the output signal of the OR circuit $OG_i$ for detecting the presence of unnecessary zeros in an above the $i$-th places and the output signal of the OR circuit $OG_{ii}$ for detecting the presence of unnecessary zeros in and below the $i$-th places. Therefore, where at least one of the received output signals is 0, it becomes known that the unnecessary zero exists in the $i$-th place.

For example, where the position of the decimal point is specified at the fifth place as determined from the lowermost place and where a four-figure number 10.04 is set (0010.0400), the contents of the register $RG_1$ become 00110100, and the output of the detector circuit $D_3$ becomes a signal 00111100 which corresponds to the logical product between the output 00111111 of the unnecessary-upper-zero detector circuit $D_1$ and the output 11111100 of the unnecessary-lower-zero detector circuit $D_2$. It is thus detected that the unnecessary zeros exist in the upper two places and the lower two places.

The timing pluse $T_H - DT_8$ impressed on each AND circuit of the detector circuit $D_3$ is utilized as the signal for control. More specifically, when the decimal point signal and the signal indicative of the existence or nonexistence of a digit from 1 to 9 in each place are loaded in the register $RG_1$ (when both the timing pulse $T_H$ and the digit signal $DT_8$ become 1), the gate of each AND circuit is opened, and the detecting result is fed to the succeeding circuit.

In this way, on the output side of the detector circuit $D_3$, whether or not the unnecessary zeros are present in the respective places appears in the form of parallel binary signals. In the static indication system, they can be used as indication control signals (zero suppress signals) without any further processing. In the dynamic indication system, only the necessary indication can be effected in such way that the parallel binary zero suppress signals are transformed into series signals by means of the register $RG_2$ as will now be described, and that the transformed signals are fed into an indication control circuit.

5. Register $RG_2$

The register $RG_2$ stores in series the detecting results of the detector circuit $D_3$. The rear stage portion of the register $RG_2$ is fed-back to the front stage portion by the AND circuit $AG_{10}$. The opening and closure of the feedback loop is controlled by the timing pulse $T_L$.

In the period in which the timing pulse $T_H$–$DT_8$ is 1, the detected results of the unnecessary zeros in the respective places are simultaneously written into the flip-flop circuits $FF_{11}$–$FF_{18}$. Next, when the timing pulse $T_L$ becomes 1, the detected results are circulatively stored within the register $RG_2$. Subsequently, when the timing pulse $T_L$ becomes 0, the feedback loop of the register $RG_2$ is opened, and the contents of the register $RG_2$ are reset. Then, rewriting of the detecting results becomes possible.

The register $RG_2$ serves also as a register for arithmetic control, for example, a register for grasping the degree of progress of calculations in multiplication and division. In this case, inputs may be fed through the front stage portion of the register $RG_2$ with the gates of the AND circuits $AG_1$ – $AG_8$ kept closed during the calculations.

As described above, in accordance with the embodiment, the unnecessary zeros in the upper and lower places can be prevented from being indicated. For example, in the case previously mentioned (the case of indicating 0010.0400), the unnecessary Os in the upper two places and the lower two places are extinguished, and only the digits in the necessary places are displayed as 10.04. Accordingly, the power consumption in the indicating portion diminishes, and the indication becomes easy to read. This applies not only to the case where the indication is conducted with luminescent elements, but also to a case where the display is performed with an electronic typewriter.

Lastly, description will be made of the operation of the circuit which generates the signals to be delivered to the register $RG_1$, that is, the digit discriminating circuit which descriminates whether or not a decimal point or a digit from 1 to 9 exists in each place.

6. Digit Discriminating Circuit

Where any number is set or where a calculated result is requested, the number is stored in the form of binary-coded decimal signals in a manner to be circulated in the numeral register RN. Similarly, the decimal point signal representative of the position of the decimal point of the number is circulatively stored in the decimal point register RD.

For example, where the positon of the decimal point is specified at the fifth place as determined from the lowermost place and where the four-figure number 10.34 is set, the contents of the numeral register RN become 00103400 (from the uppermost place to the lowermost one) when $T_H \cdot DT_8 \cdot BT_4 \cdot \bar{\Phi}2$ becomes 1. At this time, the contents of the decimal point register RD become 00010000 (from the uppermost place to the lowermost place).

The number thus stored in the numeral register RN is fed from the flip-flop circuit $FF_{101}$ at the second bit to the set preference flip-flop circuit $FF_{10}$ and serially at every bit. In the flip-flop circuit $FF_{10}$, it is discriminated whether the digit in each place is any one of the digits 1 to 9 or zero. In more detail, the flip-flop circuit $FF_{10}$ judges if there is a 1 in the series binary signal of four bits within one place of the binary-coded decimal number. For example, where a series binary signal 0010 representative of a decimal number 4 is fed, the flip-flop circuit $FF_{10}$ is set by the signal 1 at the second bit, and thereafter maintains the set state until it is reset by the bit signal $BT_4$. Accordingly, a series binary signal 1110 appears on the output side of the flip-flop circuit $FF_{10}$. Since the bit signal $BT_4$ is utilized as the reset signal, the state of the flip-flop circuit $FF_{10}$ for a certain place exerts no influence on the state for the succeeding place.

As stated above, if the contents 1 exist at any bit of a determined place of a binary-coded decimal number, the state of the flip-flop $FF_{10}$ is thereafter forced into 1 irrespective of the presence or absence of 1 or 0 within the same place. For example, where the number to be indicated is 0000 0100 0010, the outputs of the flip-flop $FF_1$ become 0000 1100 1110. Therefore, the detection of every fourth bit of the outputs of the flip-flop $FF_{10}$ makes it possible to discriminate if there is 1 within one place (4 bits) of the binary-coded decimal number. That is, the detection makes it possible to judge if the digit of the place is the decimal zero. Accordingly, the flip-flop circuit $FF_{10}$ discriminates between the presence and absence of the digit 0 (or any digit from 1 to 9) at every place, and delivers the result to the OR circuit $OG_{10}$ in the form of the signal 0 or 1. Consequently, for example, when binary signals of eight places and 32 bits as correspond to a decimal number 00103400 are supplied from the register RN, the flip-flop circuit $FF_{10}$ generates signals in which the contents of every fourth bit of the respective places are 00101100.

On the other hand, where the decimal point is located at, for example, the fifth place as determined from the lowermost place, the decimal point register RD feeds a decimal point signal 00010000 to the OR circuit $OG_{10}$. The decimal point signal at this time is equivalent to the digit signal $DT_5$.

Accordingly, a signal corresponding to the logical sum between the decimal point signal and the signal representative of whether the digit of each place is any one of the digits 1 to 9 or 0 appears on the output side of the OR circuit $OG_{10}$. For example, where the position of a decimal point is specified at the fifth place and where a four-figure number 10.34 is set, the outputs of the OR circuit $OG_{10}$ for every fourth fit of the respective places become 00111100 which is the logical sum between 00101100 and 00010000.

Even when a 4-input OR circuit is prepared in lieu of the flip-flop circuit $FF_{10}$ and has output signals of the flip-flop circuits $FF_{101}$ – $FF_{108}$ applied as its inputs, it can be similarly discriminated whether or not the binary-coded signal 1 is contained in each decimal place (in 4 bits).

While We have shown and described several embodiments in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

What we claim is:

1. A zero suppression circuit comprising:

first means, responsive to an input signal representative of an $n$-digit decimal number, and having an $n$ element memory capacity, for storing therein respective signals representative of whether a digit of said decimal number is the digit zero, and including means for storing, in one of said elements, a signal representative of the position of a decimal point in said decimal number; and second means, responsive to the contents of said first means, for detecting the presence of the digit zero at those digit positions of said $n$ digit decimal number which are unnecessary for completely representing said decimal number and comprising a first detector circuit including $n$ gate circuits respectively coupled to the $n$ memory elements of said first means, so that the outputs of the first to $i$-th memory elements of said first means are coupled to the $i$-th gate circuit of said first detector circuit, wherein $1 \leq i \leq n$.

2. A circuit according to claim 1, wherein said second means comprises a second detector circuit including n gate circuits respectively coupled to the $n$ memory elements of said first means, so that the outputs of the $n$th to $i$th memory elements of said first means are coupled to the $i$-th gate circuit of said second detector circuit, where $1 \leq i \leq n$.

3. A circuit according to claim 2, wherein said second means further includes a third detector circuit, responsive to the outputs of said first and second detector circuits, for logically combining the respective outputs of the gate circuits thereof, and for providing an output signal representative of the presence of zeros at digit positions which are unnecessary for completely representing said decimal number.

4. A circuit according to claim 3, further including an output register, coupled to said third detector circuit for storing the output signals therefrom in $n$ memory element positions.

5. A circuit according to claim 3, wherein said first means includes a numeral register, having $n$ storage positions, for receiving a signal representative of a decimal number and converting said received number into an n digit decimal number, a decimal point register having n storage positions, for storing the position of a decimal point in said decimal number, and means for logically combining the contents of selected ones of the storage positions of said numeral and decimal point registers for providing an $n$ bit signal representative of those digit positions of said n digit decimal number which are digits other than zero and the position in said $n$ digit decimal number at which a decimal point occurs.

6. A circuit according to claim 5, further including an output register, coupled to said third detector circuit for storing the output signals therefrom in $n$ memory element positions.

7. A zero suppression circuit comprising:

first means, responsive to an input signal representative of an n digit decimal number, and having an n element memory capacity, for storing therein respective signals representative of whether a digit of said decimal number is the digit zero and including means for storing, in one of said elements, a signal representative of the position of a decimal point in said decimal number, said first means further including a numeral register, having n storage positions, for receiving a signal representative of a decimal number and converting said received number into an $n$ digit decimal number, a decimal point register having n storage positions, for storing the position of a decimal point in said decimal number, and means for logically combining the contents of selected ones of the storage positions of said numeral and decimal point registers for providing an $n$ bit signal representative of those digit positions of said $n$ digit decimal number which are digits other than zero and the position in said *n* digit decimal number at which a decimal point occurs; and second means, responsive to the contents of said first means, for detecting the presence of said digit zero at those digit positions of said n digit decimal number which are unnecessary for completely representing said decimal number.

8. A circuit according to claim 7, wherein the logically combining means of said first means comprises means for logically combining the contents of the next to least significant storage position of said numeral register with the least significant storage position of said decimal point register.

* * * * *